Dec. 1, 1970 W. E. McLEAN ET AL 3,544,978

METHOD AND APPARATUS FOR DRIVING MEMORY CORE SELECTION LINES

Filed March 18, 1968 3 Sheets-Sheet 1

INVENTORS
William E. McLean &
BY David E. Ruch
Thomas N. Young
ATTORNEY

METHOD AND APPARATUS FOR DRIVING MEMORY CORE SELECTION LINES

Filed March 18, 1968 3 Sheets-Sheet 2

INVENTORS
William E. McLean &
BY David E. Ruch
Thomas N. Young
ATTORNEY

METHOD AND APPARATUS FOR DRIVING MEMORY CORE SELECTION LINES
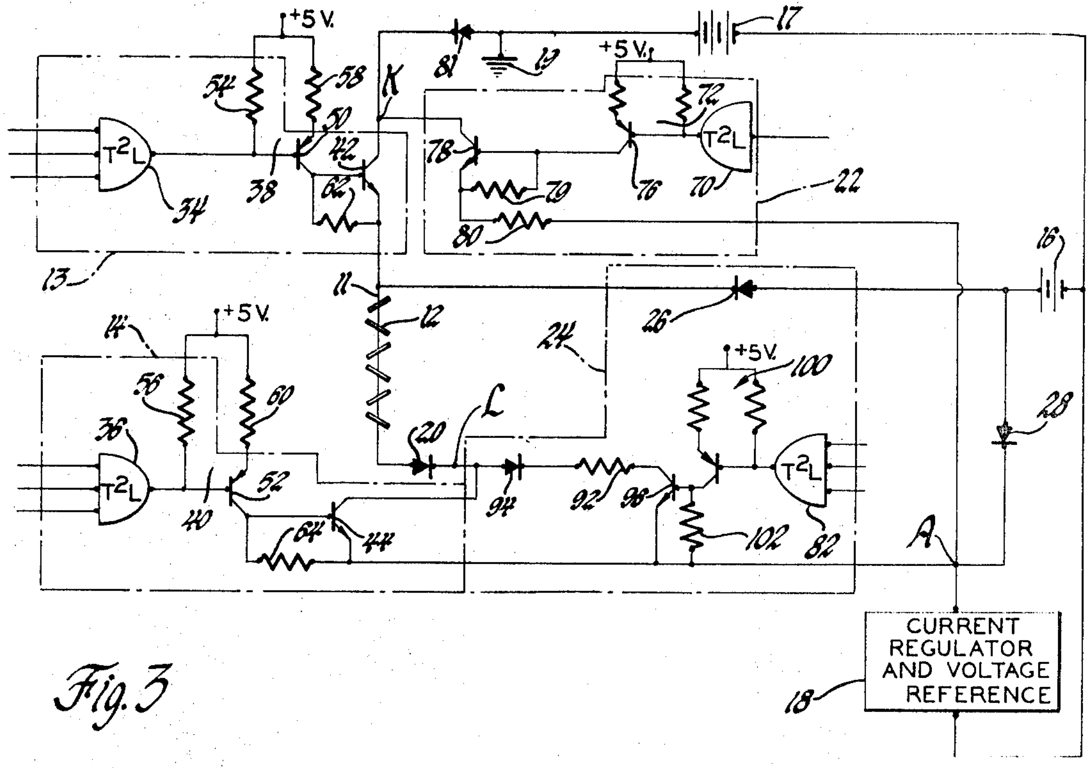
Fig. 3
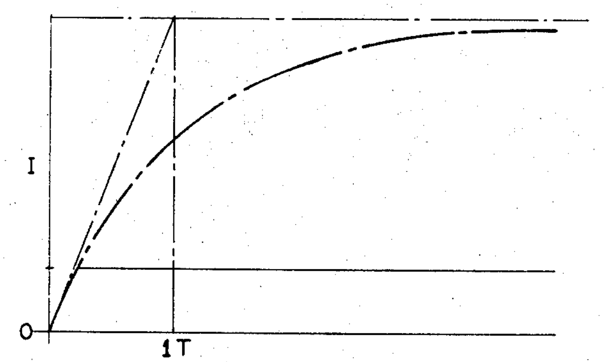
Fig. 4
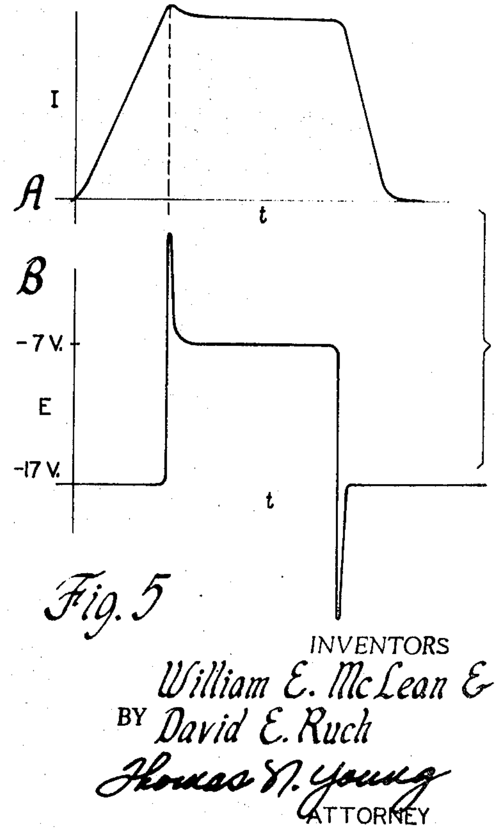
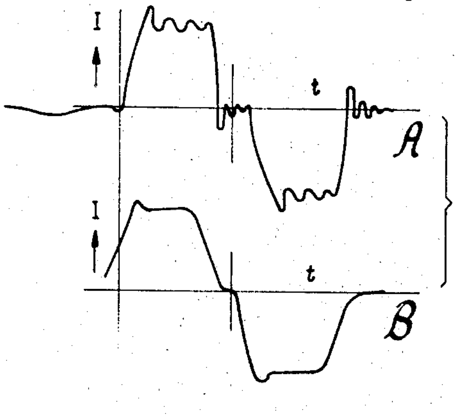
Fig. 6
INVENTORS
William E. McLean &
BY David E. Ruch
Thomas N. Young
ATTORNEY United States Patent Office 3,544,978

Patented Dec. 1, 1970

3,544,978

METHOD AND APPARATUS FOR DRIVING MEMORY CORE SELECTION LINES

William E. McLean, Hales Corners, Wis., and David E. Ruch, Playa Del Rey, Calif., assignors to General Motors Corporation, Detroit, Mich., a corporation of Delaware Filed Mar. 18, 1968, Ser. No. 713,638
Int. Cl. G11c 7/00
U.S. Cl. 340—174 12 Claims

ABSTRACT OF THE DISCLOSURE

Apparatus for supplying selection lines of a magnetic core memory with drive currents of uniform ampitude and configuration. The apparatus includes a pair of line selection switches at opposite ends of a selection line group for steering current from a source through a selected line and a current regulator that maintains the sum of the currents through the line at a constant level. The lines in the group are terminated by a set of alternately operable termination circuits, which set is common to all of the lines of a coordinate axis of the memory array. The termination circuits serve to damp voltage spikes, ringing oscillations and the inductive energy of the line upon energization and de-energization thereof and to maintain the lines of the memory stack at a fixed potential to prevent the lines from floating due to leakage currents and capacitive voltage build-ups that would establish the lines at different potentials during inactive or memory idle periods.

BACKGROUND OF THE INVENTION

The invention is directed to information storage and retrieval systems and more particularly to a driver and termination circuit arrangement for the selection lines of a magnetic core memory system to provide closely controlled, consistent operation of the memory for high performance computer applications.

Proper operation of such memories requires that the drive currents applied to the core drive lines be closely controlled and regulated within narrow margins. This is particularly so in the case of coincident current memories wherein the storage locations are accessed by a coincidence of at least two currents through respective nonparallel selection lines. Each of the selection lines, termed, for illustration, X and Y drive lines, may have a plurality of cores thereon. The cores that are common to a pair of energized selection lines are subjected to two half-select currents, the combined effect of which produces a field of sufficient intensity to "switch" or reverse the remanent magnetic state of a core. The remaining cores on these lines receive but a half select current which is insufficient to switch these cores. If the field induced by the selection line currents is opposite in direction to the remanent field of the selected core, the core is switched to the opposite magnetic state where it remains until switched back to its original state.

The switching or reversal of the flux field condition of the core induces a voltage pulse in a third line, termed a sense or output winding which may be common to all of the cores contained in a core array. In a common configuration, the sense winding passes through adjacent cores in opposite directions and is wound in such a manner as to algebraically combine and cancel voltages of lesser magnitude, also called shuttle noise, induced in the unselected cores which are contained on one or the other of the energized selection lines and are subjected to the disturbing field effect of only the half select current in that one line. The sense winding is connected to a sense amplifier that is strobed or gated with an accurately derived strobe pulse applied at a time when the output from a switched core would be at its maximum level. The presence or absence of a signal from the amplifier thus indicates the initial condition of the interrogated core, representing a binary "1" or "0" bit of information.

The process of writing a different bit of information in or re-establishing the information destructively read out of a selected core during the immediately preceding reading portion of a read-write memory cycle is similar to the reading operation, except that the half select currents are applied to the selection lines in a direction opposite to that of the read direction and an inhibit pulse, which is of an amplitude corresponding to a half select current, is selectively applied to a fourth winding, termed an inhibit winding. The latter winding extends through all of the cores in a bit representing matrix in a direction opposite to the selection lines of one coordinate axis, and, depending upon the energization or de-energization thereof, inhibits or enables switching of the selected core in the matrix. The switching and the time of switching of the cores is dependent upon the amplitude and rise time of the drive currents, which are of pulse form and must rapidly attain their switching level and be turned off rapidly for high speed, rapid cycling memory operation.

An increased level of drive current in a selection line could result in switching of unselected cores contained on that line with inadvertent destruction of data therein. On the other hand, a reduced level of drive current could undesirably prevent switching of a selected core or delay switching thereof by such an amount as to shift the sense output relative to the time of the read strobe, resulting in misoperations and reducing the margins of operation of the memory.

The lines are selected by transistor type switches which switch and steer current driven through the line upon establishing a difference of potential across the line. The application to or change in potential on the line induces a back EMF therein to force the flow of current therethrough upon turn on and to continue the flow of current upon turn off and is accompanied by the appearance of induced voltage spikes on the line. The spikes may adversely affect the switching components in the line circuit by adding to or subtracting from the normal operating voltages and causing a deviation from the proper operating amplitudes and times.

The interelectrode capacitances of the switching transistors together with other spurious circuit capacitances and the distributed capacitance of the lines to ground and to the other lines may cause the line to ring or oscillate following the induced voltage spikes thereon, creating additional noise in the output winding and possible interference with the ensuing writing portion of the memory cycle or with an immediately following memory cycle. Severe current ringing could result in switching of unselected cores receiving a half select current with consequent loss of data therein or could combine with the noise appearing in the sense winding due to the shuttle or partial switching effect of these cores on the line to produce an erroneous output from the sense winding.

During non-use or memory idle periods, the selection lines of such memories also experience capacitive build-up of voltages thereon that affect the potential of the stack and have to be discharged to preserve timing relationships and to prevent possible non-switching due to non-uniform drive current characteristics. Ill-timed capacitive discharge current can result, in a current regulated system, in reduced drive line currents during a selection process.

In recognition of some of the factors of the above character affecting the operation of such memories, the prior art has employed drive systems as in U.S. Pats. 3,027,546 to Howes et al. and 3,170,147 to Bartik et al., which use a high impedance inductance-resistor combination to affect the rate at which the current is driven through the line and utilize the stored inductive energy to act as a source of voltage to maintain a constant flow of current.

In addition to their tendency to oscillate and promote ringing, the use of inductive devices in the drive circuitry presents packaging problems because of their size where space is at a premium. Further, such devices prolong current decay and prevent rapid discharge of the inductive energy of the line upon turn-off. Thus, the line may still have energy flowing therein at the time the writing portion of the memory cycle or an ensuing memory cycle is to take place, and thereby prevent a fast cycling and recycling memory.

The Bartik patent recognizes the tendency of the lines to oscillate upon the application of current in the form of a step function to the lines and provides reflection absorbing means in the form of a characteristics impedance matching resistive termination across each separate line of the memory. The provision of a separate termination resistor across each drive line of a memory stack, of which there may be several stacks in a memory bank of an expandable memory using common electronics for the several stacks, results in an excessive part count and unnecessary duplication of parts, especially when it is to be considered that only one pair of selection drive lines of the memory is active at any one time of a memory operation.

Accordingly, the present invention has for its object to provide an improved memory driving and termination circuit arrangement for supplying memory selection lines with drive currents of uniform amplitude and configuration for reliable operation of the memory.

Another object is to provide a drive circuit for supplying current to a memory drive selection line at a rapid linear rate of rise to a predetermined level that is maintained constant at a level sufficient to assure proper core switching with acceptable signal to noise ratios for subsequent sensing.

Another object is to supply the selection lines of a memory with drive currents of constant amplitude and free of disturbances that affect the amplitude of the drive current, operation of the current switching components, and the output and the cycling of the memory.

Another object is to provide a circuit arrangement in accordance with the foregoing objects characterized by reduction of part count of drive and termination components in accordance with the concepts of an expandable memory.

Another object is to provide a termination circuit arrangement that maintains the selection drive lines of a memory organization at a fixed potential during inactive periods of the memory.

A specific object is to provide high speed switching circuitry components actuated by relatively low levels of current and operating at low potentials but capable of switching relatively high levels of current to a load without blocking or varying the current through or to the load with changes of potential of the load.

A related object is to provide switching circuitry specially suited for switching constant current in the presence of fluctuating or non-regulated voltage.

SUMMARY OF THE INVENTION

In accordance with the invention there is provided a line selection, driver and termination circuit organization for a magnetic core memory stack or memory bank having a plurality of conductive lines or windings each linking or coupled to a plurality of biremanent magnetic storage elements. A gated pair of transistor switches is connected at the opposite ends of a line, to select and connect that line in current receiving relationship with a regulated source of current. The voltage across the driven line is initially clamped imparting a constant voltage character of drive thereto in order to permit a linear and rapid rate of rise of current in the line to a prescribed or predetermined level. The clamp is then automatically removed or disabled, and the current through the line is held at the prescribed level by the current regulator, which maintains the sum of the currents therethrough, including the current from the line and the current actuated switches, at a constant level. The switches follow sudden potential excursions on the line and any fluctuations or variations of potential thereon without affecting the current in the line or the operation of the switches.

The lines are terminated by a single set of alternately operated termination circuits which are common to all of the lines driven from the same current source and which preserve the leading edge and the timing relationship of the current pulse through the lines relative to the commencement of the drive and the time of sensing and permit rapid cycling of the memory between read and write cycles.

Each of the termination circuits is placed in circuit with a line through a transistor switch that in one case connects a single or common damping resistance element in parallel across all of the lines of a coordinate axis of a memory stack or bank of memories and which in the other instance includes a switch that connects a single energy discharge and damping resistance in series with all of the lines of a coordinate axis of a stack of a memory bank. Thus, individual damping and discharge impedances are not required for each line, affording a material significant advantage over prior art forms of termination networks which employ separate termination impedance elements across or in circuit with each drive selection line.

The discharge termination circuit discharges the inductive energy of any previously activated line and damps any tendency to produce ringing upon turn off thereof. It also serves to hold all of the lines of a coordinate axis of each core stack of the memory bank at a fixed potential during memory idle periods to prevent discharge of the line capacitances that would otherwise have to be recharged upon the next turn on of the memory with resulting deleterious effects upon the cycling of the memory and upon the amplitude of the drive currents.

The above and other objects, advantages and features of the invention together with the manner of operation thereof will appear more fully from the following detailed description made with reference to the accompanying drawings.

DESCRIPTION OF DRAWINGS

FIG. 3 is a schematic electrical representation of the elements of the subject drive, selection and termination components as connected to a drive line of one coordinate axis of the memory;

FIG. 4 is a timing diagram illustrating the rise of current in the drive line;

FIGS. 5A and 5B are timing diagrams illustrating the wave shape of the pulse of current in the drive line and of the voltage at point A in the drive circuit; and FIGS. 6A and 6B are timing diagrams illustrating the wave shapes of the drive currents without and with the subject termination networks described herein.

DETAILED DESCRIPTION

Figure 1:
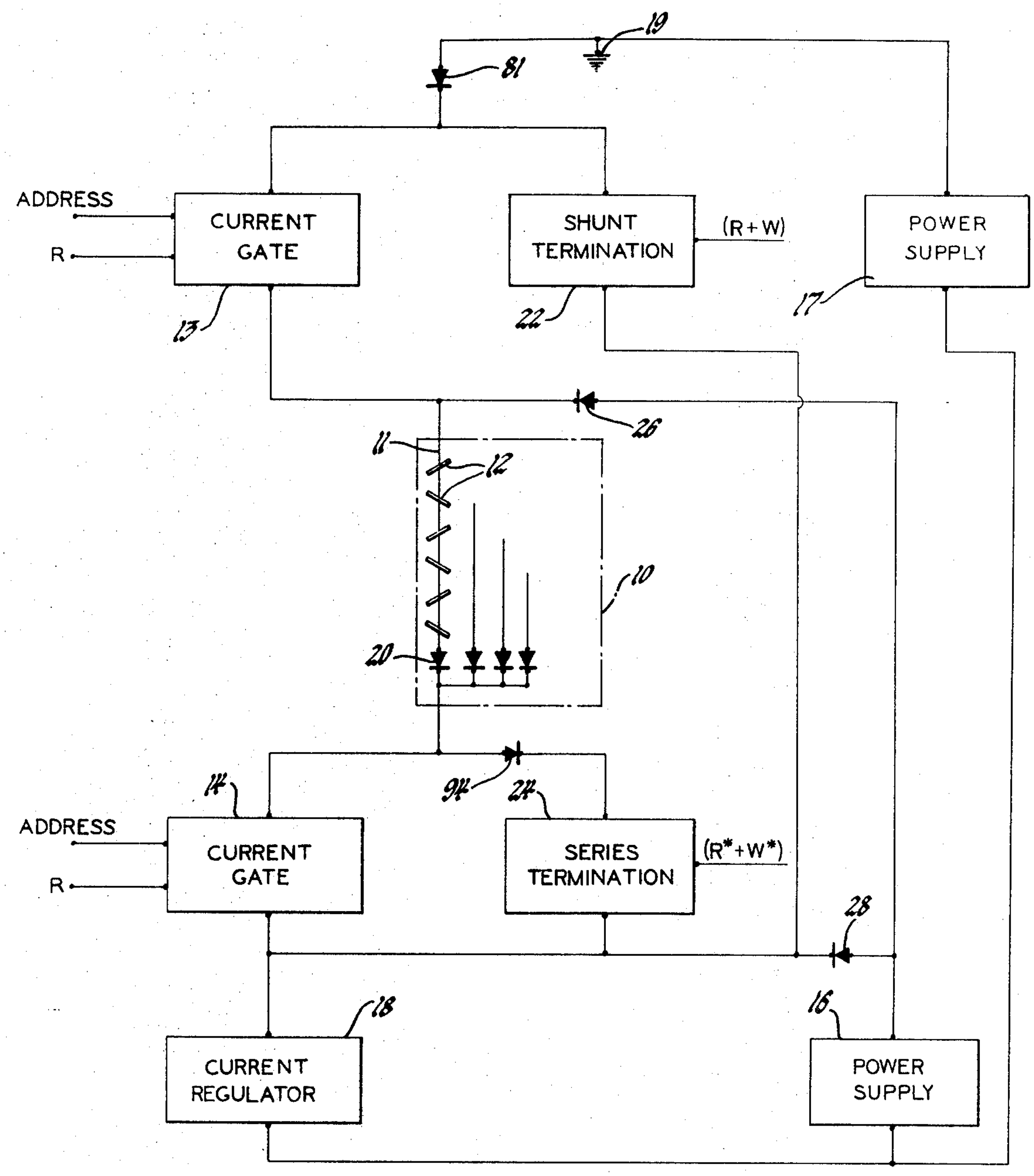
FIG. 1 is a block diagrammatic illustration of the main elements of the basic drive and termination system.

With respect to the drawings, the main elements of the basic drive and termination system are illustrated in block diagram form in FIG. 1 in which one of the plurality of drive lines of one of the coordinate axes of the memory stack 10 is shown at 11, it being understood that a similar drive and termination arrangement is employed for the drive lines of the other coordinate axis. The line 11 has a plurality of toroidal magnetic cores as 12 thereon and is connected at its opposite ends to a pair of current actuated gates or switches 13 and 14, respectively, to allow current, regulated by current regulator 18, to flow from ground 19 through the line 11 and steering diode 20 upon the application of potential thereto from the potential supply section 17 when the current gates are activated by their respective address selection signals and the presence of a read or write timing control pulse.

During the driving action a shunt termination circuit 22 is also activated by a read or write timing control pulse to place an impedance approximately equivalent to the characteristic impedance of the line across the active line in order to damp any ringing caused by the line inductances and circuit capacitances.

At the conclusion of a read or write memory operation, the current gates 13 and 14 and the shunt termination circuit 22 are deactivated. However, in order to prevent the inductive turn-off kick in the line 11 from destroying elements in the gates and to prevent ringing on turn off, both ends of the stack are clamped at a fixed potential by diode 26 and a decay loop is activated through the termination circuit 24, which places a damping or discharge resistance in series with the line to dissipate the inductive energy of the line before the commencement of the write portion of the memory cycle or an ensuing memory cycle. The drive line termination circuit 24 serves further to maintain both ends of the stack at the same potential level to prevent the stack capacitance from charging to some undesirable voltage during memory idle periods.

Figure 2:
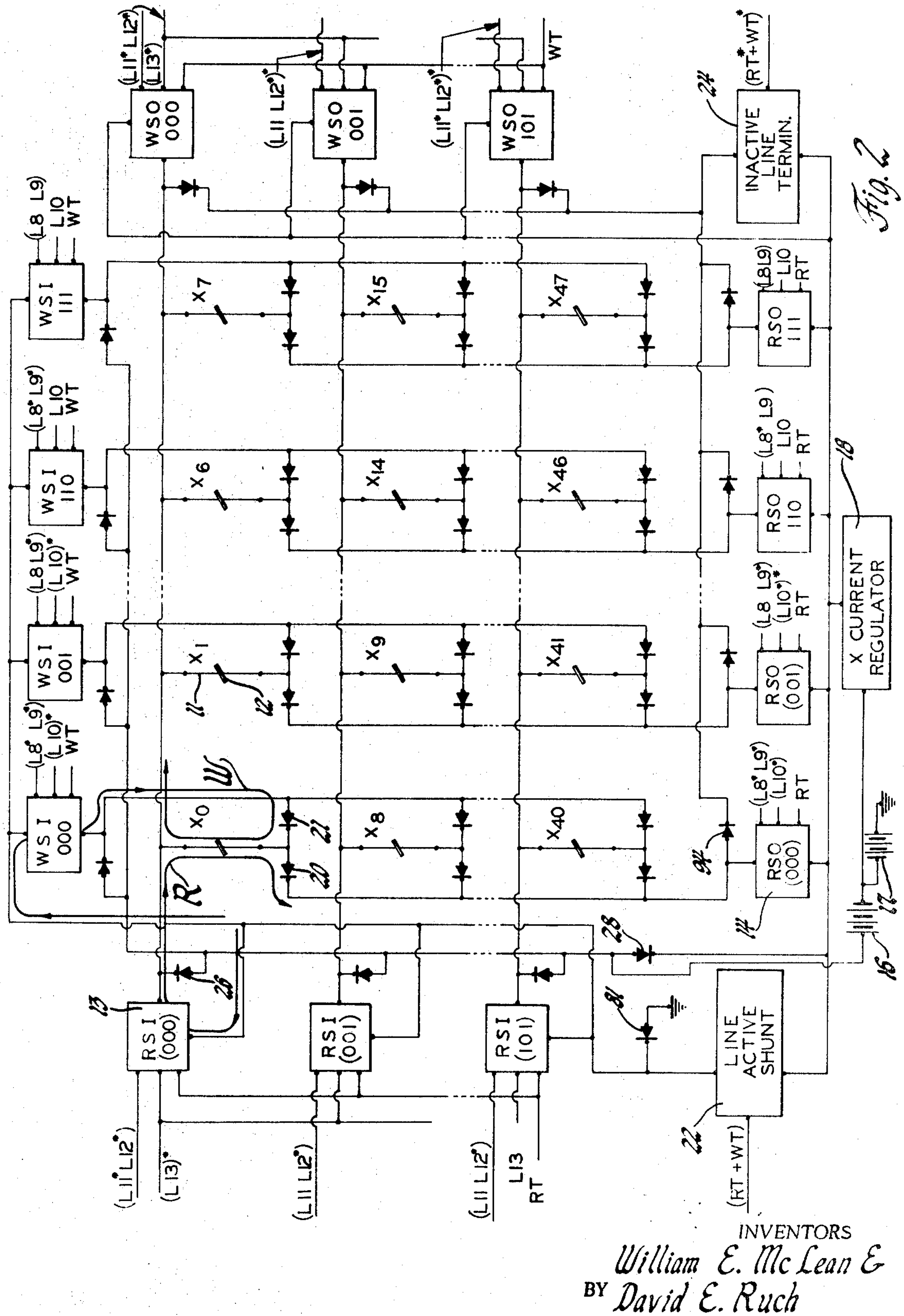
FIG. 2 represents the X axis selection matrix of switches and the termination networks as employed therewith in the drive and termination organization of the invention.

FIG. 2 illustrates the manner in which the current gates or switches are connected to the drive lines of the X coordinate axis for reading and writing of information into the memory. Two sets of switches, one for reading and one for writing operations with the switches of each set arranged in an 8 x 6 matrix, for example are employed in the illustrated X axis selection matrix comprised of a total of 28 Read and Write switches of which only 14 are shown. The switch matrix provides for the read or write selection of any one of 48 X selection lines through activation of a pair of switches connected to the opposite ends of a selection line and are referred to, for purposes of convenience, herein as "Sink" and "Source" switches.

As illustrated, each of the switches is associated with or connected to one end of a different group of selection lines with Read Sink switch RSI (000), for example, shown connected to one end of a first ordered group of lines $X_0$ to $X_7$ and Read Source switch RSO (000) connected to the other end of a second ordered group of lines $X_0$, $X_8$, to $X_{40}$ of which line $X_0$ is unique to and is contained within these two groups of lines. The switches labeled RSI (000) and RSO (000), for example, correspond to the current gates 13 and 14 of FIG. 1, and, when activated, select drive line $X_0$ to steer a half select read current therethrough in the direction of the arrow labelled R. The switches labelled WSI (000) and WSO (000) select and steer a half select write current through line X in the opposite direction, as indicated by the arrow labelled W.

The Y drive line selection matrix in the particular memory organization in which the subject invention is included provides for the selection of any one of 128 Y selection lines and is comprised of a total of 48 switches, including 24 Y Read Sink and Source switches and 24 Y Write Sink and Source switches.

Selection and activation of the switches is accomplished through addressing a pair of switches composed of a Sink and a Source switch from a decoded combination of 13 address bits, L1 through L13, from an address register (not shown) and the application of a Read or Write timing pulse, RT or WT, thereto. Bits L1 through L7 are employed for the selection of the Y lines, and bits L8 through L13 for the selection of the X lines.

The diodes connected to the drive lines are the matrix or steering diodes utilized in read and write operations of the memory. During a read operation of the memory, the diode 20 with its anode connected to the end of the respective drive line is utilized to steer current through the line. During a write operation of the memory, the diode 21 with its cathode and connected to the respective drive line is utilized to steer current. With the exception of diodes 28 and 81, the remaining diodes illustrated are associated with the current regulator 18 and with the line inactive termination circuit 24. It will be noted that the termination circuits 22 and 24 are common to and are shared by all of the drive lines of a coordinate axis of the memory as it also the current regulator. Only one current regulator and one set of termination circuits are used for each coordinate axis of drive lines, regardless of the number of memory stacks provided in the memory bank.

FIG. 3 illustrates schematically the configuration of the several components of the overall drive organization depicted in FIG. 1. The principal power supplies associated with the current regulator and the memory stack include a clamped 12 v. regulator supply 16 and a 28 v. stack supply 17. The positive terminal of the 28 v. supply is connected to ground, and its negative terminal is connected to that of the 12 v. clamp supply as shown, and to the current regulator 18, thereby placing the potential of the return side of the regulator at −28 v. The positive side of the 12 v. supply is connected through clamp diode 28 to the input point A of the regulator, which point will be at a potential of one diode voltage drop or approximately 1 v. below the potential at the anode, i.e., −16 v., of the diode 28 or 17 v. below ground reference. A +5 v. DC supply is also provided to furnish bias and operating voltages and currents for various component elements of the illustrated system.

The current actuated switch 13 and 14 are of identical construction and circuit configuration and are each shown as including a turn-on gate 34, 36; a current generator stage 38, 40; and an output switching stage 42, 44, respectively.

The gates 34 and 36 are NAND type logic elements of $T^2L$ formation, i.e., Transistor-to-Transistor Logic, which employs direct coupled transistor means to transfer logic levels from the input of the logic element to its output in accordance with the functional design of the logic element. This type of logic element employs low level operating potentials. Each of the gates 34, 36 has one or more separately addressable input terminals and another input terminal that is connected to the read-write timing circuitry to effect turn on the gate upon coincidence of or when all of the inputs thereto are in the proper state. The output of the gate will be at a potential approximately 0.2 v. above ground when it is turned on.

The current generator stages 38, 40 are activated to supply base current drive to the output stages 42, 44 when the current generators are turned on from the gates 34, 36. The generator stages 38, 40 are each shown as including a type PNP transistor 50, 52, whose base is connected to the output of the $T^2L$ gate element and through a resistor 54, 56 to the +5 v. supply that is also connected through a resistor 58, 60, to the emitter of the transistor. The base connected resistors 54, 56 provide turn-off bias from the 5 v. supply, while the emitter resistors 58, 60 are current amplitude establishing resistors that provide substantially constant current from the 5 v. supply to the emitters of the transistors 50, 52. It will be noted that while FIG. 3 shows only one line 11 and one combination of switches 13 and 14, the typical memory employs many such combinations for each drive axis. Resistors 58 and 60 can be connected to several transistors as they are to transistors 42 and 52.

The output switching stages 42, 44 of the switches 13, 14 are shown as NPN type switching transistors, the emitter and collector electrodes of each of which are connected directly in circuit with the selection line 11. The emitter of transistor 44 is connected directly to the regulator, as shown. The collector electrodes of the current generator transistors 50, 52 are shown directly connected to the base electrodes of the output transistors and through resistors 62, 64 to the emitters of the output transistors, which are driven into saturation by the base current drive received from the current stages 50, 52. The resistors 62, 64 provide turn-off bias and a leakage current path during turn-off for their respective output switching transistors.

The shunt termination circuit 22 comprises a $T^2L$ turn-on gate 70, a constant current generator stage 72, including PNP transistor 76, an output switch NPN transistor 78, leakage resistor 79 and a resistor 80. One end of resistor 80 is connected to the output of the regulator and its other end is connected by transistor 78 to point K of the drive circuit at the cathode of diode 81 when the gate is actuated by a Read or Write timing pulse. Diode 81 represents a convenient means to provide a −1 volt source with respect to ground. With reference to FIG. 2, it will be seen that any active line of a coordinate axis of the memory stack is connected across these same points. The resistor 80, which is chosen to approximate the characteristic impedance of the active line, is placed in current shunting relation across an active line, as indicated in FIG. 3, when the gate 70 is turned on with the current actuated switches 13 and 14 for selecting that line. The diode 81 provides a one volt drop to place the collector of switching transistor 42 a volt below a ground reference and its emitter at −1.5 v. to reflect a sufficiently negative potential to the collector of transistor 50 relative to its emitter, which is clamped slightly above ground, to assure transistor 50 being in the active region.

The termination circuit 24 is shown as comprising a $T^2L$ gate 82, a constant current generator stage 100, an NPN transistor 96, resistors 92 and 102 and a pair of diodes 26 and 94. The diode 26 is connected between the regulator supply 16 and the upper end of the line 11 as shown and supplies a path for continued current flow until the stored energy in the line has been discharged. The anode of diode 94 is connected at point L of the drive circuit to the cathode of the line steering diode 20, and its cathode is connected through resistor 92 to the collector of the output switch transistor 96 whose emitter is connected to the input point A of the regulator. The gate 82 is of $T^2L$ configuration and is activated by a signal representing a non-drive current condition pulse to turn on output transistor 96 and connect the drive line through resistor 92 to the current regulator. The diode 94 may be physically included in the lower current or Source switch package 14, while the diode 26 may be included in the upper current or Sink switch package. Each of Source and Sink switches of the switch selection matrix includes a diode of the character mentioned, as indicated in FIG. 2.

The current regulator 18 illustrated herein may utilize a high gain differential operational amplifier connected in a closed feedback loop to control and maintain the voltage across a current sensing resistor equal to a fixed reference voltage. Diode 28 constitutes the regulator clamp diode which supplies current from the regulator power supply 16 to the current setting regulator resistor when drive current is not flowing through the selection lines. Thus the output current from regulator 18 is constant independent of memory usage and the regulator can remain in a linear operating region.

OPERATION

The current initially flowing through the regulator 18 is that supplied from the regulator power supply 16. After the line selection switches have been turned on to permit current to flow through the line from the stack supply 17 and the upper selection switch 13, the current from the regulator power supply decreases as the current in the line builds up to its predetermined level, at which time, the regulator supply is disconnected due to the backbias of diode 28. When the current in the line has attained its established level, the current through the regulator will be composed of the drive current from the line selection switch 13 and the current driven through the line from the stack supply source 17. These currents flow into the regulator 18 at point A thereof and are collectively regulated at the current level established in the regulator.

In a coincident current memory for which the subject drive system is suitable, the level of the current supplied to a selected X drive line and to a selected Y drive line to switch a core thereon and produce an acceptable signal to noise ratio in the sense output thereof has been found, for purposes of illustration, to require about 335 ma. for each of the drive lines containing the core or cores to be switched. The current level in a line is reflective of its average active resistance, which is about 10 ohms, and the potential across the line at turn on, which is about −17 v. DC in the present instance. It will be noted that the potential across the line is greater than that necessary to establish the 335 ma. requirement of the line and would actually tend to drive a current of 1.7 amperes through the line, if the current in the line were permitted to attain this value, as indicated in the current rise timing diagram of FIG. 4. However, the current is prevented from attaining this final value through the action of the current regulator, which limits the current to the required value and constitutes a constant current source for the drive system after the current has risen to its required level. The turn on potential across the drive line is selected or determined by considerations of the time constant associated with the resistance and inductance of the drive line and of the cores thereon so as to assure a rapid and linear buildup of current in the line to its required level.

During memory idle periods and prior to drive operation, the outputs of $T^2L$ gates 34, 36 and 70 are high, and, therefore, the bases of transistors 50, 52 and 76 are substantially at the +5 v. DC supply. Since their emitters are also at this potential, forward emitter to base bias is not developed so that these transistors are held cut off. Similarly, the output transistors 42, 44 and 78 are also cut off, since no base currents are supplied to them.

With the application of the necessary address and timing control signals to the gates of the selection switches 13 and 14, the output transistor in these gates is rendered conductive and lowers the output of its respective gate from +5 v. DC to +0.2 v. DC at which it is clamped. The +0.2 v. DC is applied to the base of transistors 50, 52 and 76 to forward bias and render these transistors conductive in their active, linear region. In each case, the emitter of each of these transistors is clamped at +0.8 v. DC, which is a 0.6 v. DC rise above their respective bases due to the $V_{be}$ diode drop of the transistors. The resulting 4.2 $V_{be}$ drop of the respective transistors develops a constant current to the emitter and a constant current in the collector circuits thereof connected to the base of their respective switching transistor.

The constant base current drive to the transistors 42 and 44 renders these transistors conductive in their saturated region and places the emitter of transistor 42 at a potential level of about −1.5 v. DC below ground, thereby backbiasing diode 26 and removing the −17 v. DC applied to the upper end of the line from the regulator supply 16. The clamp diode 28, however, is still forward biased and holds the level at point A of the regulator 18 and the emitter of transistor 44 at −17 v. DC.

Thus a potential difference is established across the line at the −17 v. DC clamp level of the regulator to permit current to be driven and to flow in the line. The line is driven from this constant voltage until the current supplied thereto from the stack supply and the upper current switch attains its predetermined level. As the line current increases, the current from the regulator power supply 16 decreases proportionately to maintain the total current through the regulator at the regulated level. When the drive current has attained its final value, no more current is furnished from the regulator supply through the diode 28. The current then flowing into the regulator will be that from the stack supply and the drive currents from the line selection switches.

Upon the removal of the regulator supply, the potential at the lower end of the line then rises to a value determined by the sum of the voltage drops of the diodes 81 and 20, the collector to emitter drops of switching transistors 42 and 44, and the voltage drop established across the line by the current therethrough and the DC resistance of the line, which totals approximately 7 volts in the present instance. This results in reverse biasing of diode 28 and in a sudden and rapid rise of the potential at the emitter of transistor 44 of approximately 10 volts from a −17 v. DC level to about a −7 v. DC level, as shown in FIG. 5B, and is accompanied by an induced voltage spike at the lower end of the line, as indicated.

The sudden rise in potential at the emitter of transistor 44 at the lower end of the line appears also at the collector of its driving transistor 52, which is operating in its linear range and is connected in a constant current configuration. The shift in potential at the collector of transistor 52 is taken up across the transistor, which continues to supply a constant current therefrom irrespective of the potential change at the collector thereof. Since the emitter of transistor 44 is connected to the regulator, both its base and emitter are connected to regulated sources. Therefore, the collector current will also be constant and unaffected by voltage excursions or large shifts in the potential level on its emitter as occurs when diode 28 is disabled upon the transition of the drive from a constant voltage to a constant current character.

The shunt termination circuit 22 becomes effective when the current in the line has attained its limited value and serves to damp overshoot and consequent ringing and voltage reflections on the lines resulting from a sudden change in potential thereon. The input gate 70 to the termination circuit is activated with the line selection switches 13 and 14 by a high logic level input signal representing a read or write time control signal. Output switch transistor 78 is activated to connect one end of resistor 80 therethrough to point K in the drive circuit to which point all of the upper line selection sink switches are also connected. The other end of resistor 80 is connected to the point A at the input of the regulator to which all of the lower line selection or Source switches are connected. The resistor is thus placed in current shunting relation with any activated one of the lines of a coordinate axis of the memory that is selected by a pair of upper and lower line selection switches to receive current from the drive circuit. The resistor 80 is chosen to approximate the characteristic impedance of an active line, which may be in the order of 220 ohms for one of the coordinate axes of the memory for which the termination circuit is provided.

Upon the expiration or removal of the read or write timing control pulse, the line selection switches 13 and 14 and shunt termination circuit 22 are disabled and the inactive line termination circuit 24 is enabled by the turn off of the read or write timing control pulse rising from a 0 or low to about a +3.3 volt true logic level. The output of $T^2L$ gate 82 will then be such as to activate transistor 96 and connect one end of resistor 92 to input point A of the regulator. The other end of resistor 92 is connected through diode 94 to point L of the drive circuit. With the turn off of the line selection switches, regulator clamp diodes 26 and 28 become forward biased to place the upper end of the line and the emitter of transistor 96 at the same potential. Resistor 92 is thus effectively placed in a closed decay loop for discharging the stack capacitance as well as to prevent large induced voltage swings and consequent ringing upon turn off of the line.

The magnitude of the resistor 92 is considerably less than that of resistor 80 and is chosen to be in the order of, say approximately 22 ohms to limit the peak of the voltage spike.

FIG. 6B illustrates the effect of the termination circuits on the form of the current in the line. The wave shape of the current is preserved and is of uniform wave front and amplitude characteristics, free of disturbances of the character shown in FIG. 6A that would be obtained without the use of the termination circuits.

It will be noted that the inactive line termination circuit 24 is still active after the line has been de-energized and during memory idle periods when no information is being read from or written into the memory. The diode 28 and the termination circuit 24 maintain both ends of the line at the same potential, i.e., −17 v., to prevent the line from leaking or recharging the line capacitance during memory idle periods. The termination circuit is common to all of the lines of a coordinate axis, as all of the lines are clamped at their lower end through the diodes connected to each source switch such as diode 94. The circuit keeps all of the lines of the stack at the same potential, and, therefore, the stack from floating to different potentials, thereby preventing duty cycle errors of memory operation. This expedient avoids the necessity of discharging the line capacitances upon the next turn on of the memory. Since the total current available is limited and regulated by the regulator 18, the current needed to recharge the lines would be drawn from the lower line selection or Source switch and would reduce the driving current and the current available to an activated line to switch the cores, and would thereby affect the margins of the memory operation.

FIG. 5A illustrates the form of the read current appearing at point A of the subject drive circuit utilizing the constant current actuated switches and termination circuits described herein. The wave shape is of uniform characteristics and presents a leading edge exhibiting a repeatable rapid and linear build up to a predetermined level, which is maintained of constant amplitude to provide proper switching of the cores, and has a rapid and linear turn off or fall off.

It is to be understood that the foregoing description relates to a specific embodiment of the invention and is not to be construed in a limiting sense. For a definition of the invention, reference should be had to the appended claims.

What is claimed is:

1. A circuit for driving a selection line of magnetic memory device comprising in combination, a current regulating device, means establishing a difference of potential between one end of the line and one side of the current regulator, a source of external control pulses, and a current actuated switch responsive to said external control pulses and including a first and a second transistor of opposite conductivity types of which the first transistor is normally nonconducting and is connected as a constant current generator to turn on and drive the second transistor as a switch, said second transistor being connected between the other end of the line and the other side of the current regulator.

2. A driving circuit in accordance with claim 1 above and further including means for terminating said selection line comprising a resistance termination element and a switch connecting said resistance element to an end of the line and to the said other side of the current regulator.

3. A driving circuit in accordance with claim 1 above including means for terminating said selection line comprising a termination element of an impedance related to the characteristic impedance of the line and a switch connecting said termination element in shunt with the line upon the activation of said current actuated switch.

4. A driving circuit in accordance with claim 1 above including means for terminating said selection line comprising a termination element having a resistance less than that of the characteristic impedance of the line and a switch connecting said element in series with the line upon deactivation of said current actuated switch.

5. A driving and termination circuit in accordance with claim 4 above wherein said means for terminating said selection line comprises, a termination element having a resistance less than that of the characteristic impedance of the line and a switch connecting said element to the said other end of the line and to the said other side of the current regulator upon the deactivation of said current actuated switch.

6. A driving circuit in accordance with claim 1 including means for terminating said selection line including a pair of inversely operated termination circuits comprising a first termination circuit including a termination element of an impedance equivalent to the characteristic impedance of the line and a switch connecting said termination element in shunt with said line upon activation of said current actuated switch, and a second termination circuit including a termination element of a resistance considerably lower than that of the first termination element but higher than the resistance of the line and another switch connecting said second termination element in series with the line upon deactivation of said current actuated switch.

7. A driving and termination circuit for a selection line of a magnetic memory device comprising in combination, a current regulating device including a first source of potential for operation of said regulator, a second source of potential of a potential greater than said first source for driving current through said line and connected at one side to one side of the current regulator and the source of potential therefor, a first current actuated switch connected to the other side of said second source of potential and to one end of the line, a second current actuated switch connected to the other end of the line and to the other side of the current regulator, a source of external control pulses for activation of said switches, a termination element of a resistance less than the characteristic impedance of the line, a switch connecting said resistance to the said other end of the line and to the said other side of the current regulator upon deactivation of said first and second current actuated switches, and a pair of unilateral conduction devices each connected to the other side of said first source of potential and, respectively, connected to the said one end of the line and to said other side of the current regulator and poled to maintain both ends of the line at a fixed potential intermediate the potential of said first and said second sources of potential upon deactivation of said line.

8. A termination circuit for the drive lines of a magnetic memory device selectively connected in a driving circuit including, means for energization of a line including a source of potential, a first plurality of separately activatable line selection switches each connected to a common point of the drive circuit of a fixed potential level and to one end of a different group of several different groups of lines, a second plurality of separately activatable line selection switches each connected to a second point in the drive circuit of a different potential level than said first point and to an end of a still different group of several still different groups of lines of which one of the lines of a group of lines connected to one switch of the second plurality of switches is common to a group of lines connected to one switch of the first plurality of switches, whereby a unique line is selected by the selective actuation of one switch of said first plurality of switches and one switch of said second plurality of line selection switches, and means for selectively actuating said switches including a source of control pulses, said termination circuit including a single impedance element for all of the lines connected to said first and to said second plurality of line selection switches and a switch activated by said source of control pulses and connecting said impedance element in shunt across a selected line between said common point and the second point of the drive circuit, said impedance element having an impedance equivalent to the characteristic impedance of a line.

9. A termination circuit for the drive lines of a magnetic memory device selectively connected in a driving circuit including means for energization of a line including a source of potential for driving current through the driving circuit, a first plurality of separately activatable line selection switches each connected to a common point of the drive circuit of a fixed potential level and to one end of a different group of several different groups of lines, a second plurality of separately activatable line selection switches each connected to a common point of the drive circuit of a fixed potential level and to one end of a different group of several different groups of lines, a second plurality of separately activatable line selection switches each connected to a second point in the drive circuit of a different potential level than said first point and to an end of a still different group of several still different groups of lines ot which one of the lines of a group of lines connected to one of the second plurality of switches is common to a group of lines connected to one switch of the first plurality of switches, whereby a unique line is selected by the selective actuation of one switch of said first plurality of switches and one switch of said second plurality of line selection switches, and means for selectively actuating said switches including a source of control pulses, said termination circuit including a first impedance element of an impedance equivalent to the characteristic impedance of a line, a switch activated from said source of control pulses with the activation of a pair of line selection switches and connecting said impedance element in shunt across an activated line between said common point and the second point of the drive circuit, a second impedance element of an impedance several times less than said first impedance element, and another switch activated from said source of control pulses upon the deactivation of said line selection switches and a selected line and connecting said second impedance element to said second point of said drive circuit and to the end of the group of lines containing the selected line connected to the said one switch of the second plurality of line selection switches.

10. A regulated driving circuit for driving a selection line of a magnetic memory device comprising in combination, a current regulating device including a first source of power for operation of said regulator, a second source of power of a potential greater than said first source for driving current through said line and connected at one side to one side of the current regulator and to one side of the source of power therefor, a first constant current actuated switch connected to the other side of said second source of power and to one end of the line, a second constant current actuated switch connected to the other end of the line and to the said other side of the current regulator, a source of external control pulses for activation of said switches, and a diode connected to the other side of said first source of potential and to said other side of the current regulator and poled to maintain the said other end of the line connected through said second current actuated switch to the current regulator at a constant level of potential intermediate the potential of the first and second sources of power until the current in the line has attained a predetermined level established by the regulator.

11. A driving circuit for a current activated utilization device comprising in combination, a current regulator, means applying a fixed potential to one end of the device and a different potential to one side of the current regulator, a source of external control pulses, and a current actuated switch responsive to said external control pulses and including a first and a second transistor of opposite conductivity types of which the first transistor is normally nonconducting and is connected as a constant current generator to turn on and drive the second transistor as a switch, said second transistor being connected between the other end of the device and the other side of the current regulator.

12. A memory drive system comprising in combination, a drive selection line including a plurality of bistable magnetic elements thereon, a regulated source of current including a current regulator for regulating the current through said drive selection line, switching means for connecting the drive line in current receiving relation with said regulated source including a gate, a constant current generator and an output switching stage driven from the current generator stage, said current regulator including a voltage reference input stage, a current regulating output stage providing a regulated level of current therefrom, and means for adjusting the level of the current regulated by the regulator in response to changes in the current from the current generator driving the output switching stage of the switching means.

References Cited

UNITED STATES PATENTS

| | | | |
|---|---|---|---|
| 3,119,025 | 1/1964 | Lourie et al. | 307—88 |
| 3,170,147 | 2/1965 | Bartik et al. | 340—174 |
| 3,209,337 | 9/1965 | Crawford | 340—174 |
| 3,210,741 | 10/1965 | Cohler et al. | 340—174 |
| 3,250,922 | 5/1966 | Parham | 307—281 |
| 3,351,924 | 11/1967 | Meyerhoff et al. | 340—174 |
| 3,383,526 | 5/1968 | Berding | 307—270 |

STANLEY M. URYNOWICZ, Jr., Primary Examiner

K. E. KROSIN, Assistant Examiner

PO-1050
(5/69)

UNITED STATES PATENT OFFICE
CERTIFICATE OF CORRECTION

Patent No. 3,544,978 Dated December 1, 1970

Inventor(s) William E. McLean and David E. Ruch

It is certified that error appears in the above-identified patent and that said Letters Patent are hereby corrected as shown below:

In the Specification, Column 6, line 17 "it" should read -- is --. Column 12, lines 16-20, beginning with "common point of the drive..." delete to "... tion switches each connected to a", as it is a repeat of the line immediately above it.

Signed and sealed this 27th day of April 1971.

(SEAL)
Attest:

EDWARD M.FLETCHER,JR.
Attesting Officer

WILLIAM E. SCHUYLER, JR.
Commissioner of Patents